US00RE46520E

(19) United States
(12) Reissued Patent
Chou et al.

(10) Patent Number: US RE46,520 E
(45) Date of Reissued Patent: Aug. 22, 2017

(54) SERVER CLUSTER AND CONTROL MECHANISM THEREOF

(71) Applicant: Quanta Computer Inc., Taoyuan (TW)

(72) Inventors: Le-Sheng Chou, Zhongli (TW); Sz-Chin Shih, New Taipei (TW)

(73) Assignee: Quanta Computer Inc., Taoyuan (TW)

(21) Appl. No.: 14/686,458

(22) Filed: Apr. 14, 2015

Related U.S. Patent Documents

Reissue of:
(64) Patent No.: 8,819,469
Issued: Aug. 26, 2014
Appl. No.: 13/449,630
Filed: Apr. 18, 2012

(30) Foreign Application Priority Data

Oct. 5, 2011 (TW) ..... 100136173 A

(51) Int. Cl.
*G06F 1/00* (2006.01)
*G06F 11/00* (2006.01)
(Continued)

(52) U.S. Cl.
CPC ..... *G06F 11/00* (2013.01); *G06F 1/3209* (2013.01); *G06F 1/3287* (2013.01); *G06F 11/3006* (2013.01); *G06F 11/3055* (2013.01); *H04L 12/12* (2013.01); *H04L 12/24* (2013.01); *H04L 12/26* (2013.01); *G06F 11/0709* (2013.01); *G06F 11/0793* (2013.01);
(Continued)

(58) Field of Classification Search
CPC ..... H04L 12/12; H04L 12/24; H04L 12/26; H04L 49/356; G06F 11/709; G06F 11/793; G06F 11/3006; G06F 11/3055; G06F 1/3209; G06F 1/3287; Y02B 60/1282; Y02B 60/34
USPC ..... 713/300, 310, 320–324, 330, 340
See application file for complete search history.

(56) References Cited

U.S. PATENT DOCUMENTS 5,696,895 A * 12/1997 Hemphill et al. ..... 714/4.3
6,269,288 B1 * 7/2001 Smith ..... 700/295
(Continued)

FOREIGN PATENT DOCUMENTS

CN 102144374 A 8/2011
TW 200509593 A 3/2005
(Continued)

OTHER PUBLICATIONS

Second Office Action mailed on Aug. 4, 2015 in Chinese Application No. 201110315416.9.
(Continued)

*Primary Examiner* — Kenneth J Whittington
(74) *Attorney, Agent, or Firm* — Nixon Peabody, LLP

(57) ABSTRACT

A server cluster including a network switch and multiple server nodes is provided. The network switch is connected to an external network. Each server node performs an operation system and respectively includes a network port, a network chip and a south bridge chip. The network port is connected to the network switch via a cable. The network chip outputs a power-off signal according to a received power-off packet after the network switch is started. The south bridge chip outputs a shutdown signal to shut down the server node according to the power-off signal when the server node is turned on and the operation system is working normally.

14 Claims, 3 Drawing Sheets

(Amended)

(51) Int. Cl.

| | |
|---|---|
| ***H04L 12/24*** | (2006.01) |
| ***H04L 12/26*** | (2006.01) |
| ***H04L 12/56*** | (2006.01) |
| ***G06F 1/32*** | (2006.01) |
| ***G06F 11/30*** | (2006.01) |
| ***H04L 12/12*** | (2006.01) |
| *G06F 11/07* | (2006.01) |
| *H04L 12/931* | (2013.01) |

(52) U.S. Cl.
CPC ..... *H04L 49/356* (2013.01); *Y02B 60/1282* (2013.01); *Y02B 60/34* (2013.01)

(56) References Cited

U.S. PATENT DOCUMENTS

| | | | | |
|---|---|---|---|---|
| 6,473,865 | B1 * | 10/2002 | Kamoshida | G06F 1/10 713/401 |
| 6,654,896 | B1 * | 11/2003 | Saunders | G06F 1/3215 710/260 |
| 6,859,882 | B2 * | 2/2005 | Fung | 713/300 |
| 6,968,465 | B2 * | 11/2005 | Freevol | G06F 1/30 323/908 |
| 7,069,317 | B1 * | 6/2006 | Colrain et al. | 709/224 |
| 7,352,289 | B1 * | 4/2008 | Harris | 340/870.07 |
| 7,380,144 | B2 * | 5/2008 | Green | G06F 1/26 713/300 |
| 7,472,179 | B2 * | 12/2008 | Tarui et al. | 709/223 |
| 7,573,832 | B2 * | 8/2009 | Kenghe | 370/252 |
| 7,664,991 | B1 * | 2/2010 | Gunda et al. | 714/43 |
| 8,212,396 | B2 * | 7/2012 | Chiou | 307/39 |
| 8,271,632 | B2 * | 9/2012 | Kobayashi et al. | 709/223 |
| 2008/0183880 | A1 | 7/2008 | Sasage et al. | |
| 2011/0161695 | A1 * | 6/2011 | Okita et al. | 713/310 |
| 2012/0226918 | A1 * | 9/2012 | Rallo | 713/300 |

FOREIGN PATENT DOCUMENTS

| | | | |
|---|---|---|---|
| TW | 200709609 | A | 3/2007 |
| TW | 200828887 | A | 7/2008 |

OTHER PUBLICATIONS

Summary of Second Office Action mailed on Aug. 4, 2015 in Chinese Application No. 201110315416.9.
First Office Action mailed on Jan. 12, 2015 in Chinese Application No. 201110315416.9.
Summary of First Office Action mailed on Jan. 12, 2015 in Chinese Application No. 201110315416.9.

* cited by examiner

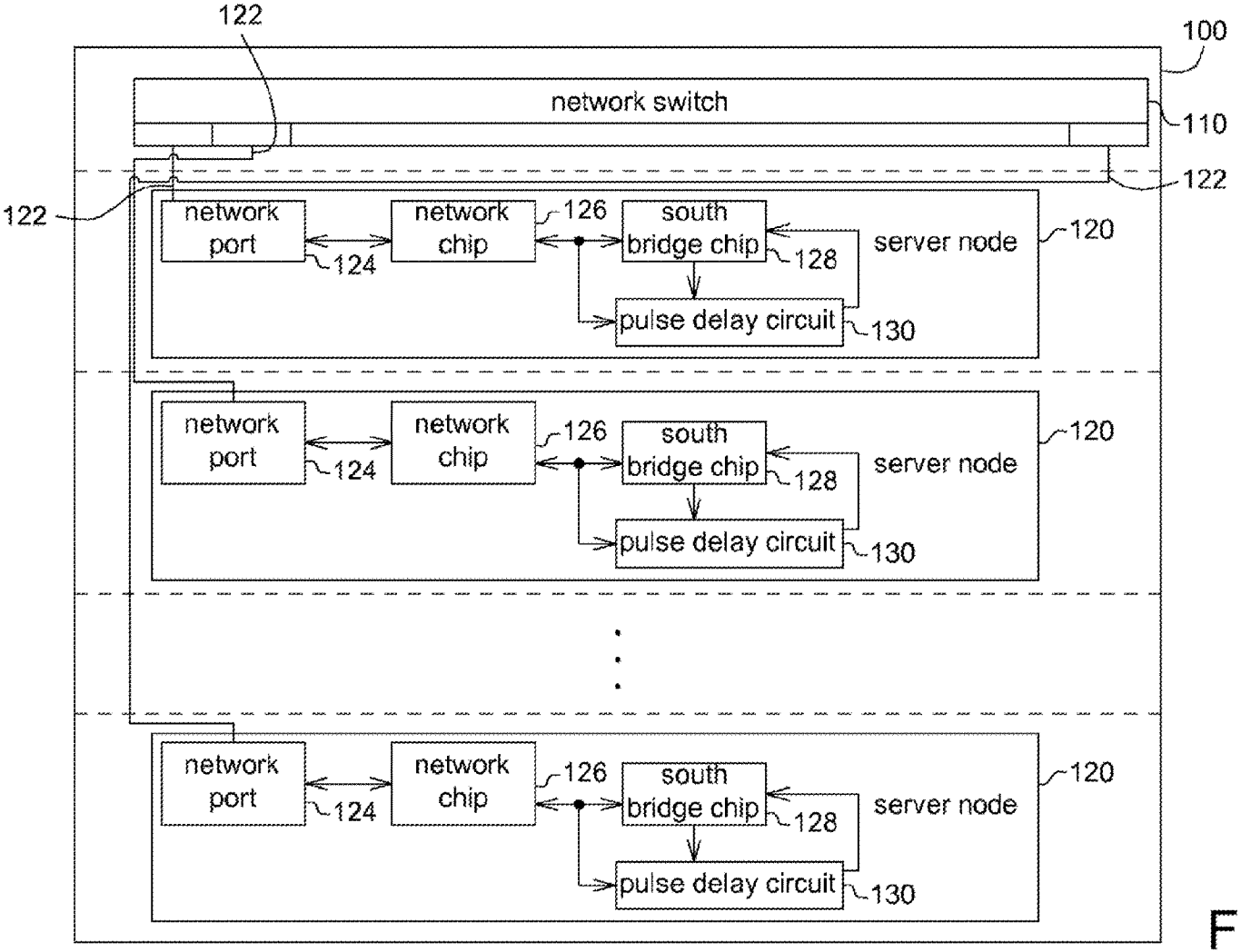
FIG. 1
(Amended)

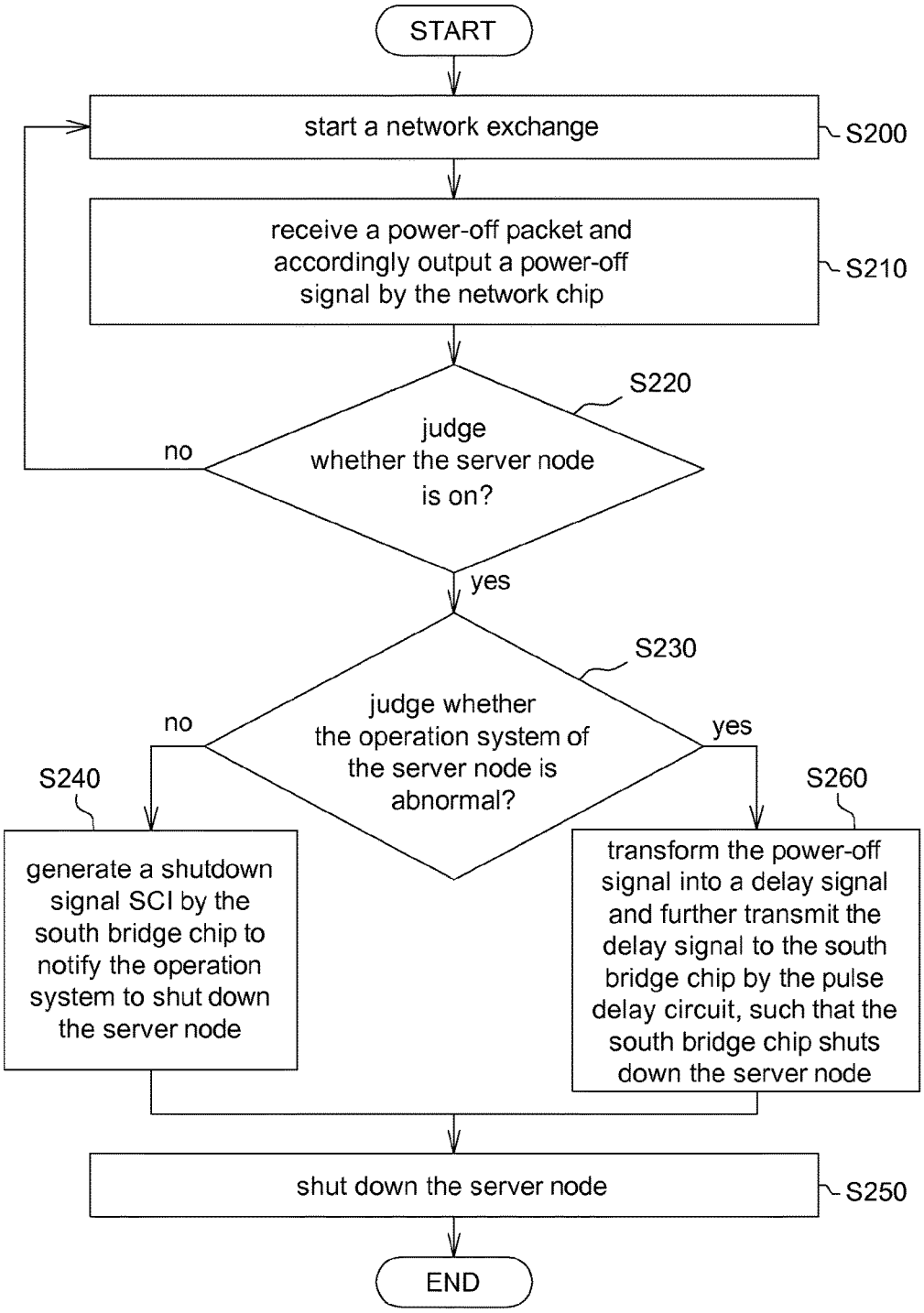
FIG. 2
(Amended)

SERVER CLUSTER AND CONTROL MECHANISM THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit of Taiwan application Serial No. 100136173, filed Oct. 5, 2011, the subject matter of which is incorporated herein by reference.

BACKGROUND OF THE INVENTION

1. Field of the Invention

The invention relates in general to a server cluster and a control mechanism thereof.

2. Description of the Related Art

The blade server is optimized with modular design to reduce the physical space and energy to a minimum and further simplify the server configuration. The operation of the blade server relies on manual operation, or, the administrator can turn off the power with a baseboard management controller (BMC) operated by a remote-end management server. The aforementioned mechanism must use a remote-end management server and a baseboard management controller, so the cost of the blade serve cannot be effectively reduced.

SUMMARY OF THE INVENTION

The invention is directed to a server cluster and a control mechanism thereof. The power of the server node is turned off according to a detected power-off packet of a network without using any baseboard management controller (BMC), so that the cost of the blade serve can be effectively reduced.

According to a first aspect of the present invention, a server cluster including a network switch and multiple server nodes is provided. The network switch is connected to an external network. Each server node performs an operation system and respectively includes a network port, a network chip and a south bridge chip. The network port is connected to the network switch via a cable. The network chip outputs a power-off signal according to a received power-off packet after the network switch is started. The south bridge chip outputs a shutdown signal to shut down the server node according to the power-off signal when the server node is turned on and the operation system is working normally.

According to a second first aspect of the present invention, a control mechanism of a server cluster is provided. The server cluster includes a network switch and multiple server nodes. Each server node performs an operation system and respectively includes a network port, a network chip and a south bridge chip. The network switch is connected to an external network. The network port is connected to the network switch via a cable. The control mechanism of a server cluster includes the following steps. A network switch is started. A network chip is used for outputting a power-off signal according to a received power-off packet. When the server node is turned on and the operation system is working normally, the south bridge chip is used for outputting a shutdown signal to shut down the server node according to the power-off signal.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 1 shows a server cluster according to one embodiment of the invention;

FIG. 2 shows a flowchart of a control mechanism of a server cluster according to one embodiment of the invention;

DETAILED DESCRIPTION OF THE INVENTION

Figure 3:
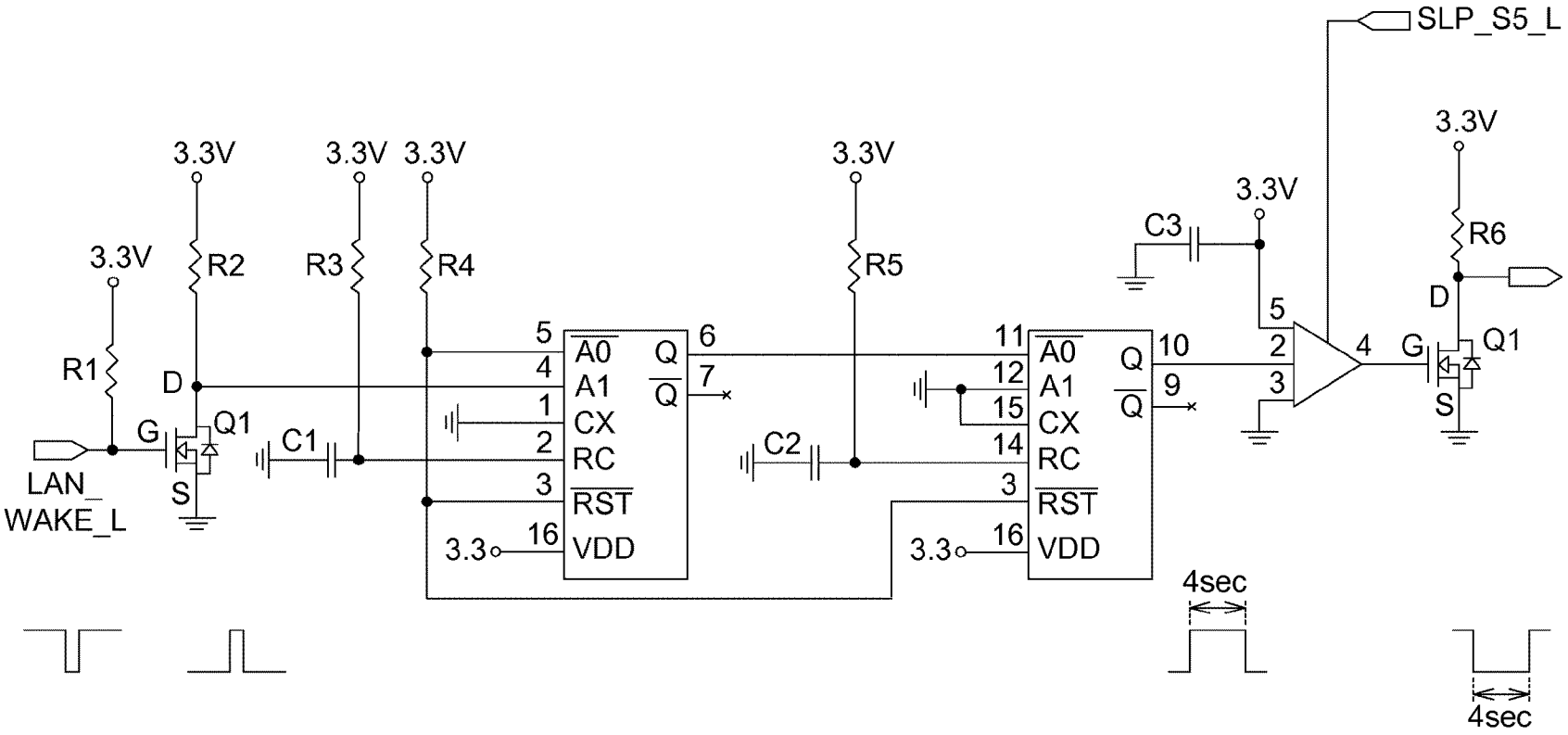
FIG. 3 shows a circuit diagram of an example of a pulse delay circuit according to one embodiment of the invention.

The invention relates to a server cluster and a control mechanism thereof. The power of the server node is turned off according to a detected power-off packet of a network without using any baseboard management controller (BMC), so that the cost of the blade serve can be effectively reduced.

Referring to FIG. 1, a server cluster according to one embodiment of the invention is shown. The server cluster 100 includes a network switch 110 and multiple server nodes 120. The network switch 110 is connected to an external network such as an Internet. Each server node 120 includes a network port 124, a network chip 126, a south bridge chip 128 and a pulse delay circuit 130. The network port 124 is connected to the network switch 110 via a network link 122 such as a cable. The network chip 126 outputs a power-off signal according to a received power-off packet after the network switch 110 is turned on. The power-off packet is such as but not limited to a network reboot on LAN (ROL) packet or a network wake on LAN (WOL) packet. The south bridge chip 128 is electrically connected to the network chip 126. The pulse delay circuit 130 is electrically connected to the network chip 126 and the south bridge chip 128.

Referring to FIG. 2, a flowchart of a control mechanism of a server cluster according to one embodiment of the invention is shown. In step S200, a network switch 110 is started. In step S210, a power-off packet is received by a network chip 126, and a power-off signal PWR_OFF_L is outputted accordingly. In step S220, whether the server node 120 is turned on is judged. If the server node 120 is turned off, then none of the south bridge chip 128 and the pulse delay circuit 130 needs to generate action, and the process returns to step S200. If the server node 120 is turned on, then the process proceeds to step S230. In step S230, whether the operation system of the server node 120 is abnormal such as crash or hang-up is judged.

When the operation system of the server node 120 is normal or is working normally, then the process proceeds to step S240. In step S240, the pin of a system management interrupt (SMI) of the south bridge chip 128 is enabled by the power-off signal PWR_OFF_L to generate a shutdown signal SCI to notify the operation system to shut down the server node 120. In step S250, the server node 120 is shut down. If the operation system of the server node 120 is abnormal such as hang-up, then the process proceeds to step S260. In step S260, the power-off signal PWR_OFF_L is transformed into a delay signal and further transmitted the delay signal to the south bridge chip 128 by the pulse delay circuit 130, such that the south bridge chip 128 outputs a power signal PWR_BUT_L to shut down the server node 120.

In the aforementioned mechanism, the pulse delay circuit 130 substantially detects an on/off state of the server node 120 according to a signal SLP_S5_L of the south bridge chip 128. The pulse delay circuit 130 transforms a power-off signal PWR_OFF_L into a low level delay signal whose pulse width amounts to 4 seconds when the server node 120 is turned on and the operation system is abnormal. Under the current protocol, the low level delay signal whose pulse width amounts to 4 seconds enables the south bridge chip 128 to force the operation system to shut down the server node 120.

Referring to FIG. 3, a circuit diagram of an example of a pulse delay circuit according to one embodiment of the invention is shown. In the pulse delay circuit 130, the power-off signal PWR_OFF_L whose pulse width is merely a few micro-seconds is inverted first. Then, the pulse width is delayed by an RC circuit. Lastly, the signal SLP_S5_L is outputted when the server node 120 is turned on and inverted as a low level delay signal whose pulse width amounts to 4 seconds.

According to the server cluster and the control mechanism thereof disclosed in the above embodiments of the invention, a power-off packet of the network, such as a network reboot on LAN (ROL) packet or a network wake on LAN (WOL) packet, is detected with a simple logic circuit to turn off the power of the server node without using a baseboard management controller, such that the cost of the server cluster can be effectively reduced.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A server cluster, comprising:

a network switch connected to an external network; and a plurality of server nodes, wherein each server node performs an operation system and [respectively] comprises:

a network port connected to the network switch via a cable;

a network chip used for outputting a power-off signal according to a received power-off packet after the network switch is started;

a south bridge chip used for outputting a shutdown signal to shut down the server node according to the power-off signal when the server node is turned on and the operation system is working [normally]; and a pulse delay circuit that transforms the power-off signal into a delay signal and transmits the delay signal to the south bridge chip when the operation system is abnormal and the server node[,] is turned on, such that the south bridge chip shuts down the server node; wherein the pulse delay circuit judges whether the server node is turned on through the south bridge chip.

2. The server cluster according to claim 1, wherein the power-off packet is a network [power-on] *reboot on LAN* packet or a network wake on LAN packet.

3. The server cluster according to claim 1, wherein the delay signal has a low level pulse whose pulse width amounts to 4 seconds.

4. A control [mechanism] *method* of a server cluster, wherein the server cluster comprises a network switch and a plurality of server nodes, each server node performs an operation system and [respectively] comprises a network port, a network chip and a south bridge chip, the network switch is connected to an external network, the network port is connected to the network switch via a cable, and the control [mechanism] *method* comprises:

starting the network switch;

outputting a power-off signal by the network chip according to a received power-off packet; and outputting a shutdown signal by the south bridge chip to shut down the server node according to the power-off signal when the server node is turned on and the operation system is working [normally], wherein each server node further comprises a pulse delay circuit, and the control [mechanism] *method* further comprises judging whether the server node is abnormal when the operation system is turned on; and transforming the power-off signal into a delay signal and further transmitting the delay signal to the south bridge chip by the pulse delay circuit when the operation system is abnormal, such that the south bridge chip shuts down the server node;

wherein the pulse delay circuit judges whether the server node is turned on through the south bridge chip.

5. The control [mechanism] *method* of a server cluster according to claim 4, wherein the power-off packet is a network [power-on] *reboot on LAN* packet or a network wake on LAN packet.

6. The control [mechanism] *method* of a server cluster according to claim 4, wherein the delay signal has a low level pulse whose pulse width amounts to 4 seconds.

*7. A server cluster, comprising:*

*a network switch connected to an external network; and*

*a plurality of server nodes, wherein each server node performs an operation system and comprises:*

*a network port connected to the network switch;*

*a network chip used for outputting a power-off signal according to a received power-off packet;*

*a south bridge chip used for outputting a shutdown signal to shut down the server node according to the power-off signal when the server node is on and the operation system is working; and*

*a pulse delay circuit that transforms the power-off signal into a delay signal and transmits the delay signal to the south bridge chip when the operation system is abnormal and the server node is on, such that the south bridge chip shuts down the server node.*

*8. The server cluster according to claim 7, wherein the pulse delay circuit judges whether the server node is turned on through the south bridge chip.*

*9. The server cluster according to claim 7, wherein the power-off packet is a network reboot on LAN packet or a network wake on LAN packet.*

*10. The server cluster according to claim 7, wherein the delay signal has a low level pulse whose pulse width amounts to 4 seconds.*

*11. A control method for a server cluster, wherein the server cluster comprises a network switch and a plurality of server nodes, each server node performs an operation system and comprises a network port, a network chip, a pulse delay circuit, and a south bridge chip, the network*

*switch is connected to an external network, the network port is connected to the network switch, and the control method comprising:*

*starting the network switch;*

*outputting a power-off signal by the network chip according to a received power-off packet;*

*judging whether the server node is abnormal when the operation system is on;*

*outputting a shutdown signal by the south bridge chip to shut down the server node according to the power-off signal when the server node is on and the operation system is working; and*

*transforming the power-off signal into a delay signal and further transmitting the delay signal to the south bridge chip by the pulse delay circuit when the operation system is abnormal, such that the south bridge chip shuts down the server node.*

*12. The control method of claim 11, wherein the pulse delay circuit judges whether the server node is turned on through the south bridge chip.*

*13. The control method according to claim 11, wherein the power-off packet is a network reboot on LAN packet or a network wake on LAN packet.*

*14. The control method according to claim 11, wherein the delay signal has a low level pulse whose pulse width amounts to 4 seconds.*

* * * * *